US006331742B1

(12) United States Patent
Renkes et al.

(10) Patent No.: US 6,331,742 B1
(45) Date of Patent: Dec. 18, 2001

(54) ELECTRIC MOTOR CONNECTOR MODULE

(75) Inventors: Kenneth R. Renkes; Robert W. Damerow, both of Morrison, IL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/248,479

(22) Filed: Feb. 11, 1999

Related U.S. Application Data

(60) Provisional application No. 60/114,446, filed on Dec. 31, 1998.

(51) Int. Cl.[7] .............................................. H02K 11/00

(52) U.S. Cl. ................................... 310/68 C; 439/885

(58) Field of Search .............................. 439/884, 885; 310/68 C; 318/783; 361/24

(56) References Cited

U.S. PATENT DOCUMENTS

| | | | | |
|---|---|---|---|---|
| 2,739,294 | * | 3/1956 | Batcheller | 439/849 |
| 3,422,395 | * | 1/1969 | Fisher | 439/884 |
| 3,918,790 | * | 11/1975 | Filson | 439/885 |
| 4,092,573 | * | 5/1978 | D'Entremont | 318/713 |
| 4,225,210 | * | 9/1980 | Haag et al. | 439/884 |
| 4,414,530 | * | 11/1983 | Bouffard et al. | 338/25 |
| 4,555,684 | * | 11/1985 | Slack | 335/66 |
| 4,862,306 | * | 8/1989 | Lisauskas | 361/24 |
| 5,038,199 | * | 8/1991 | Igarashi | 257/678 |
| 5,055,726 | * | 10/1991 | D'Entremont et al. | 310/71 |
| 5,242,317 | * | 9/1993 | Watanabe | 439/595 |
| 5,326,288 | * | 7/1994 | Lu et al. | 439/851 |
| 5,729,416 | | 3/1998 | Renkes et al. . | |
| 5,762,526 | * | 6/1998 | Kuramoto et al. | 439/877 |
| 5,775,963 | * | 7/1998 | Byfield, Jr. | 439/884 |

* cited by examiner

*Primary Examiner*—Joseph Waks
(74) *Attorney, Agent, or Firm*—Carl B. Horton; Damian G. Wasserbauer; Armstrong Teasdale LLP

(57) ABSTRACT

A terminal including a connector plate having raised surfaces which provide the terminal with the required thickness is described. The terminal also includes a slot extending from the connector plate leading edge to facilitate pushing a locking type or quick connect type connector thereover.

13 Claims, 4 Drawing Sheets

ELECTRIC MOTOR CONNECTOR MODULE

CROSS-REFERENCE TO RELATED APPLICATIONS

This application claims the benefit of U.S. Provisional application No. 60/114,446, filed Dec. 31, 1998.

BACKGROUND OF THE INVENTION

This invention relates generally to terminals for making electrical connections, and more particularly, to a tab terminal.

Dynamoelectric machines such as motors typically include a start winding and a run winding. The start winding is utilized to initiate rotation of the motor rotor. Particularly, the magnetic field generated by the relatively high inductive reactance start winding in a resistance split phase motor may be about 30 degrees out-of-phase (in both a physical sense and a time sense) with respect to the field generated by the relatively lower inductive reactance rim winding. When the run and start windings are energized, the geometric and time phase relationship between magnetic fields generated by the run and start windings, and the magnetization of the rotor, cause the rotor to begin rotating from a standstill condition. Once the rotor has sufficient torque to attain its normal running speed, the start winding is "switched out" of the motor circuit so that the out-of-time phase geometrically spaced magnetic field generated by the start winding does not adversely impact motor operation.

Start and run capacitors sometimes are utilized to change the time phase relationship between the magnetic fields generated by the run and start windings. A start capacitor connected in series circuit with the start winding causes the magnetic field generated by the start winding to be, for example, about 90 degrees (rather than about 30 degrees) out-of-time phase with the run winding field. As compared to a 30 degrees time phase shift, a 90 degrees time phase shift of the start winding magnetic field results in a higher starting torque, which is desirable in some applications.

In addition to run and start capacitors, other externally mounted motor components may include motor protectors and motor start switches. A motor overload protector coupled between the motor windings and the motor power supply, and responsive to such a high current condition, operates to de-energize the motor windings if such a high current condition persists for a predetermined time period. A motor starter switch, sometimes referred to herein as a "starter", may be employed to control the energization and de-energization of the motor start winding.

By housing a starter switch and protector in one unit, manufacturing costs may be reduced and assembly of at least the starter and protector to a motor may be simplified. Examples of such units are set forth in U.S. Pat. No. 5,729,416, which is assigned to the present assignee. The motor starter and protector unit includes a terminal for making an external connection to ground. The terminal is formed by bending, to about 90 degrees, an extension and folding over portions of such extension. A female connector is then pushed over the terminal to make the connection to ground.

In accordance with the applicable standard, the terminal must have a nominal thickness of $^{32}/_{1000}$ inch. With the terminal described above, the required thickness is achieved by folding over portions of the extension. The folding operation results in significant wear of the tooling. Particularly, the tooling required for such folding operations generally presses the extension, and during such pressing operations, opposing tool faces are brought into abrupt surface to surface contact. Such operations cause the tooling faces to chip and crack. The tooling faces therefore require frequent machining, or replacement, which increases fabrication costs and time.

Further, with the known terminal, the leading edge of the terminal is sharp and sometimes digs into the locking mechanism on the mating connector, which increases the difficulty in assembling the connector to the terminal. Also, in some applications, the assembly of the connector over the terminal is a "blind" operation, i.e., the operator cannot view the terminal as the connector is slid thereover.

It would be desirable to provide a terminal that satisfies the applicable thickness requirement, yet also can be fabricated without causing excessive tool wear. It also would be desirable to provide such a terminal that is easily coupled to a connector.

BRIEF SUMMARY OF THE INVENTION

These and other objects may be attained by a terminal including a connector plate having raised, or embossed, surfaces arranged so as to satisfy the applicable thickness requirement, and which also can be fabricated without use of the folding operation required in connection with the terminal described above.

More particularly, and in one embodiment, the connector plate includes a fluted section having raised surfaces. The raised surfaces provide that the terminal has the thickness required by the applicable standard, without requiring that the terminal be folded over. By eliminating the folding operation while still providing the required thickness, the terminal can be fabricated with less tool wear. In addition, and since the material is not folded over at the leading edge of the plate, the thickness of the terminal at the leading edge is reduced as compared to the thickness of the above described terminal. Reducing the thickness at the plate leading edge provides that a mating connector can be more easily engaged and slid thereover.

Further, the leading edge of the plate includes tapered sections, and a slot extends from and is open at the plate leading edge. The tapered sections facilitate alignment of the connector plate with the female connector, and pushing the connector thereover. As the connector is pushed over the terminal, the connector locking mechanism slides through the slot. As the connector is further pushed over the terminal, the locking mechanism easily slides along a ramp formed by one of the raised surfaces and into a retaining hole in the terminal.

The above described terminal satisfies the applicable thickness and connector locking requirements, yet also can be fabricated without causing excessive tool wear. In addition, the terminal is easily coupled to a connector.

DETAILED DESCRIPTION OF THE INVENTION

The present terminal is sometimes described herein in the context of a combination motor starter and protector module. The terminal, however, can be used in many other applications and is not limited to practice in connection with such modules.

Figure 1:
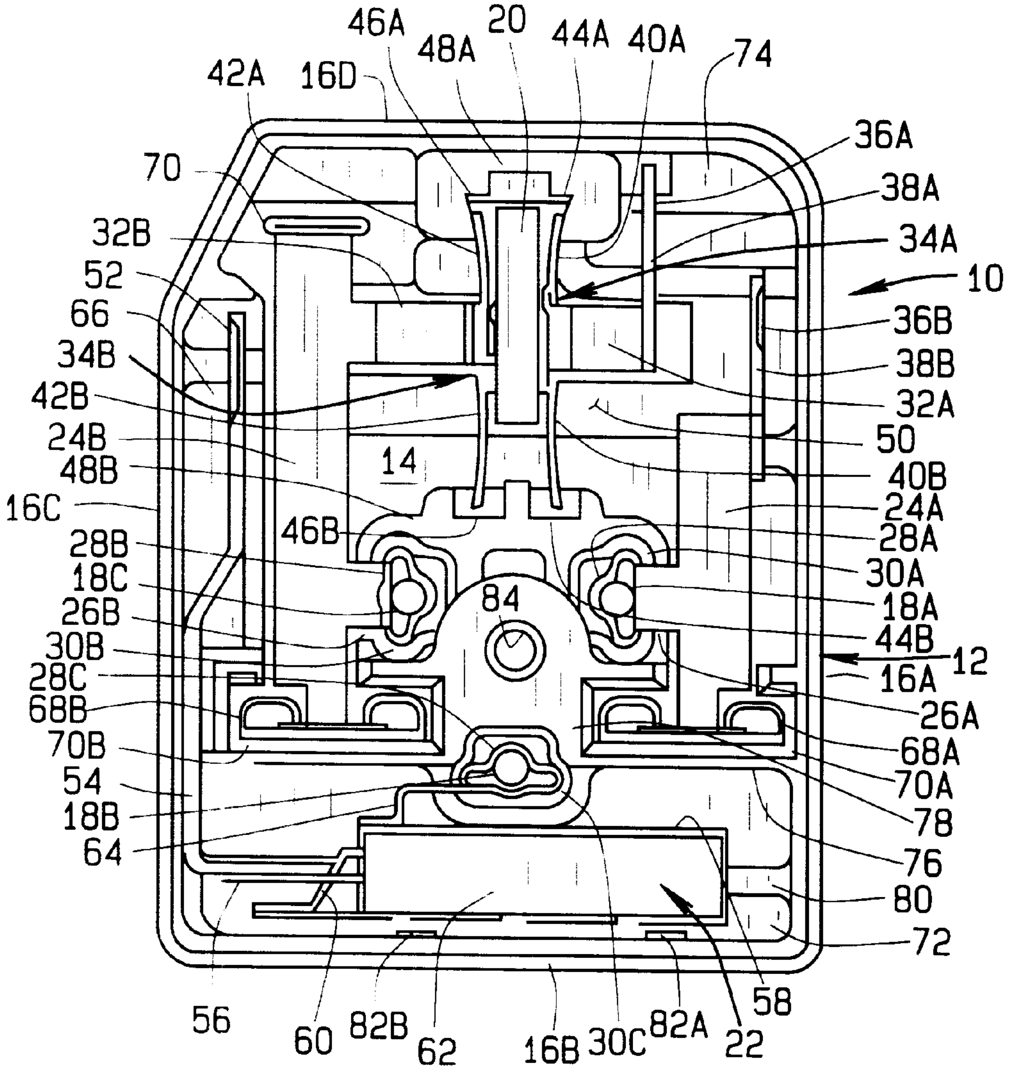
FIG. 1 is a top plan view of a combination starter-protector module.

FIG. 1 is a top plan view of a module 10 including a base member 12 having a base surface 14 and sidewalls 16A–D extending from base surface 14 forming a partial enclosure. Pin receiving openings or apertures 18A–C are formed in base surface 14 and are spaced to receive Fusite pins which are coupled to a compressor motor and extend from a compressor motor housing (not shown). Mounted within base member 12 is a PTCR, positive temperature coefficient resistor, disc 20 and a protector unit 22. A first electrical conductor member 24B and a second electrical conductor member 24A include first leg portions 26A–B which form female pin connectors or receptacles 28A–B. Female pin receptacles 28A–B align with apertures 18A and 18C, respectively, formed in base surface 14 and are sized to receive the Fusite pins which extend from the compressor motor housing. Receptacles 28A–B are located within receptacle supports 30A–B which extend from base surface 14.

Conducting member 24B includes second leg portion 32B which forms PTCR contact plate 34B, sometimes referred to as a pressure plate. Second leg portion 32A, which forms PTCR contact plate 34A, is broken away from conducting member 24A. Capacitor start terminals 36A and 36B are connected by conductors 38A and 38B, respectively, to second leg portions 32A and conducting member 24A, respectively. Terminals 36A and 36B are utilized for coupling a start capacitor in series circuit with PTCR disc 20.

Pressure plates 34A–B have dimples formed thereon. Fingers 40A–B and 42A–B extend from plates 34A–B and slide into grooves 44A–B and 46A–B formed in mounts 48A–B. Fingers 40A–B and 42A–B are biased so as to force and hold the dimples of plates 34A–B against and in electrical contact with PTCR disc 20. Fingers 40A–B and 42A–B are not in contact with PTCR disc 20. Although only one finger 40A and 42A on the upper portion of each plate 34A–B is shown, two fingers extend from plate 34A–B upper portion into grooves 44A and 46A. Also, a portion of each plate 34A–B extends into grooves 44A and 46A.

In addition to contact plates 34A–B, a tapered surface 50 of base surface 14 also supports PTCR disc 20. Contact plates 34A–B and tapered surface 50 cooperate to maintain PTCR disc 20 in a vertical position relative to base surface 14. By maintaining PTCR disc 20 in such a vertical position, the cooling rate of PTCR disc 20 may be increased, which facilitates reducing the amount of time to restart a motor.

Protector unit 22 is coupled to a power input terminal 52 by a conducting element 54. Particularly, a lead 56 extending from the stationary contact (not shown) of protector unit 22 is spot welded to conducting element 54. A heater element 58 is electrically connected in series circuit with the stationary, and movable contacts (not shown) by spot welding a lead 60, which extends from the movable contact (not shown) of protector unit 22, to heater element 58. The stationary and movable contacts are enclosed in a plastic housing 62, and heater element 58 is configured in a serpentine shape and disposed around housing 62. Heater element 58 is in contact with external surfaces of housing 62 and also is electrically connected, by a lead 64, to a female pin receptacle 28C aligned with pin receiving aperture 18B and located within connector support 30C.

Power terminal 52 and lead 54 are elevated relative to conducting member 24B to maintain lead 54 and member 24B electrically separated. Specifically, power terminal 52 and lead 54 are supported on a platform 66 which extends inward from wall 16C and which facilitates maintaining such electrical separation.

Run capacitor receptacles 68A–B are connected to conducting members 24A–B, respectively. Receptacles 68A–B are disposed within support slots 70A–B which extend from base surface 14. Receptacles 68A–B are configured to receive the spade terminals of an external run capacitor (not shown). Extensions of members 24A–B are bent at about a 90° angle and receptacles 68A–B are secured to such extensions. Each receptacle 68A-B is sufficiently long to be able to receive, at one end, an extension of member 24A–B and, at the other end, a spade terminal of a run capacitor.

Base member 12 of module 10 is generally configured to include a protector compartment 72 and a starter compartment 74. An integral wall 76 and a platform 78 separate compartments 72 and 74. In protector compartment 72, protector unit 22 is spaced above base surface 14 by spacers 80 which extend from, and are substantially perpendicular to, walls 16A and 16C. Only one spacer 80 extending perpendicular to wall 16A is visible in the Attachment 4 illustration. A similar spacer extends perpendicular to wall 16C. Spacers 82A–B which extend from wall 16B maintain protector unit 22 spaced from wall 16B. Although compartments 72 and 74 are separate, such compartments 72 and 74 are in thermal communication with one another. Particularly, heat generated by PTCR disc 20 affects the temperature within protector compartment 72.

A cover (not shown) is placed over base member 12 to form an enclosure. A fastener opening 84 is formed through platform 78. Opening 84 aligns with a similar opening in the cover and a fastener such as an eyelet or a rivet is inserted through the aligned openings. The fastener is then crimped and secures the cover to base member 12.

The cover includes openings so that the spade terminals of a run capacitor and power leads from a power source can be connected to the appropriate receptacles and terminals. The cover also includes openings which align with terminals 36A and 36B. Leads extending from a remotely mounted start capacitor are inserted through such cover openings and into electrical engagement with terminals 36A and 36B. The cover further includes a run capacitor support arm which facilitates securing a run capacitor to the module. Further details regarding module 10 are set forth in U.S. Pat. No. 5,729,416, which is assigned to the present assignee.

With respect to terminal 70, such terminal 70 is utilized for making an external connection to ground. Terminal 70 is formed by bending, to about 90 degrees, an extension of member 24B and folding over portions of such extension. Such folding operation is necessary in order for terminal 70 to meet the applicable thickness requirement. The folding operation, however, results in significant wear on tooling. Particularly, the tooling required for such folding operations generally presses the terminal, and during such pressing operations, opposing tool faces are brought into abrupt surface to surface contact. Such operations cause the tooling faces to chip and crack. The tooling faces therefore require frequent machining, or replacement, which increases fabrication costs and time.

Figure 2:
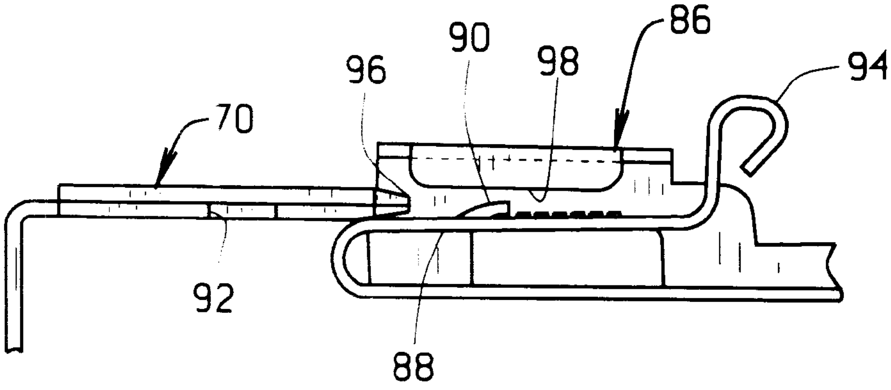
FIG. 2 is a side, partial cross sectional view of the terminal shown in FIG. 1 and partially inserted female connector.

FIG. 2 is a side, partial cross sectional view of terminal 70 and a female connector 86. Connector 86 includes a locking mechanism 88 having a protrusion 90 for being positioned in an opening 92 of terminal 70. A lever 94 is provided so that an operator, by pressing down on lever 94, can more easily unlock and slide connector 86 off terminal 70. Specifically, by pressing down on lever 94, protrusion 90 is moved under terminal 70 out from hole 92 so that connector 86 can be withdrawn from terminal 70. A leading edge 96 of terminal 70 is tapered to facilitate pushing connector 86 over terminal 70. When fully secured to connector 86, terminal 70 is between surface 98 and locking mechanism 88 with protrusion 90 located in opening 92.

Figure 3:
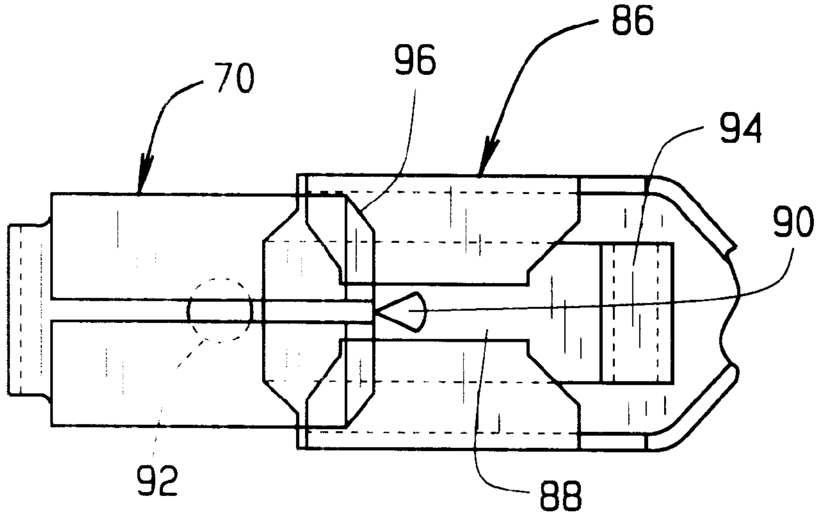
FIG. 3 is a top view of the terminal and connector shown in FIG. 2.

Referring to FIGS. 2 and 3, as connector 86 is pushed over terminal 70, leading edge 96 tightly fits between surface 98 and locking mechanism 88. When leading edge 96 contacts protrusion 90, edge 96 may dig into protrusion 90 as connector 86 is slid thereover, which increases the difficulty in pushing connector 86 over terminal 70. As the operator continues to push connector 86 over terminal 70, connector 86 locks in place when protrusion 90 is located, and extends, within opening 92.

Figure 4:
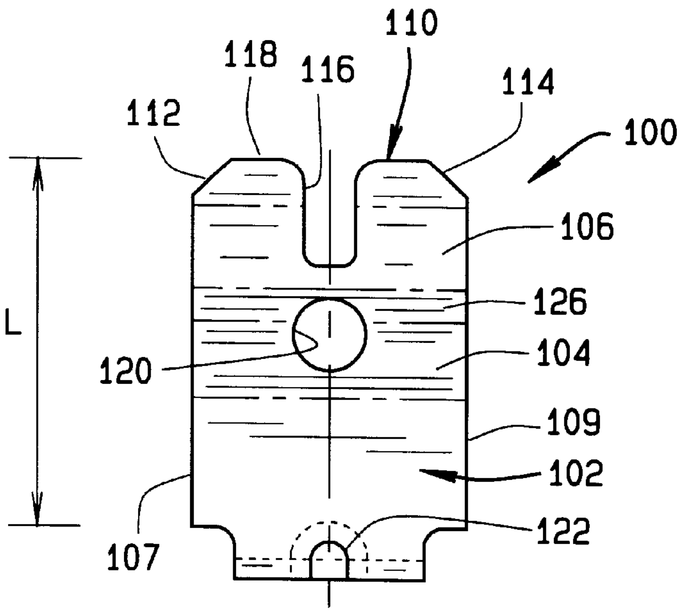
FIG. 4 is a plan view of a terminal in accordance with one embodiment of the present invention.
Figure 5:
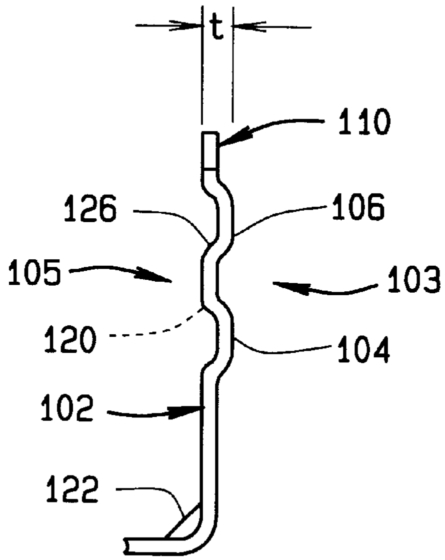
FIG. 5 is a side view of the terminal shown in FIG. 4.

FIG. 4 is a plan view, and FIG. 5 is a side view, of a terminal 100 in accordance with one embodiment of the present invention. Terminal 100 has thickness t which satisfies the applicable standard, yet can be fabricated without causing excessive tool wear. Terminal 100 includes a connector plate 102 having raised surfaces 104 and 106 which form a fluted configuration. Connector plate 102 includes an upper surface 103, a lower surface 105, a first side 107, and a second side 109. Raised surfaces 104 and 106 extend from first side 107 to second side 109 substantially linearly. The raised, or embossed, surfaces 104 and 106 provide that terminal 100 has the required thickness t, and eliminate a need for the folding operation required in connection with terminal 70.

End portion 110 of plate 100 is configured to facilitate pushing a female connector over terminal 100. Particularly, end portion 110 includes tapered, or chamfered, sections 112 and 114, and a slot 116 extends from leading edge 118. Sections 112 and 114, and slot 116, facilitate pushing a female connector over terminal 100 as described below in more detail. An opening 120 in plate 102 facilitates maintaining positive locking connection between terminal 100 and the female connector. A gusset 122 is provided at an end of plate 102 opposing end portion 110 to provide extra strength and rigidity.

Terminal 100, in one specific embodiment, is fabricated using 0.0150–0.0160thick stainless steel ½ hard, and has a tensile strength of 150 k p.s.i. (minimum), yield strength of 110 k p.s.i. (minimum), and elongation of 15% (minimum). Terminal 100 may have a length L of about 0.367–0.357 inches, and have a thickness t of about 0.030 to 0.033 inches. Slot 116 has a width of about 0.047 to 0.053 inches, and a length of about 0.105 to 0.115 inches. Of course, the particular dimensions and material may vary depending upon the particular application. Terminal 100 is fabricated using well known forming and pressing operations.

Figure 6:
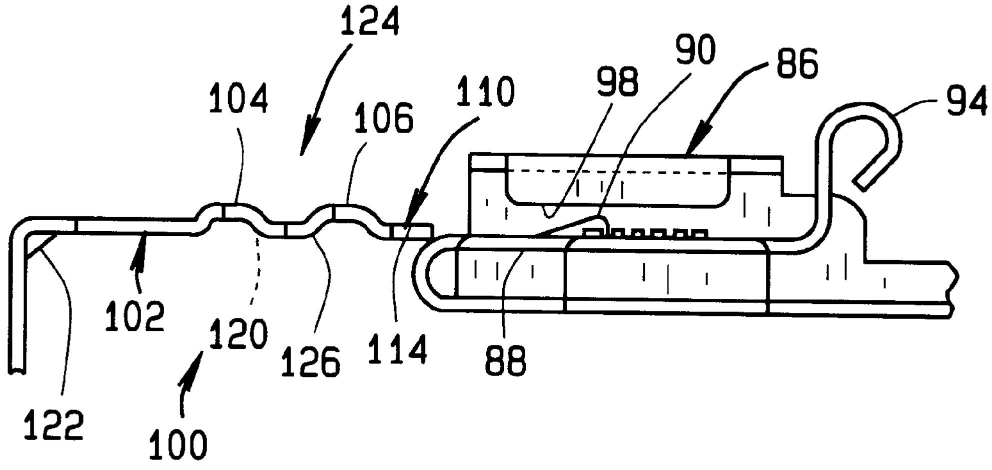
FIG. 6 is a side, partial cross sectional view of the terminal shown in FIG. 4 and partially inserted female connector.
Figure 7:
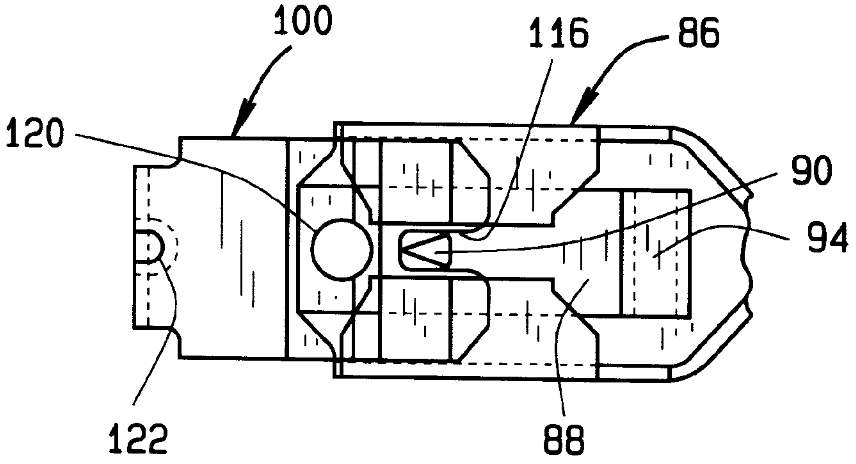
FIG. 7 is a top view of the terminal and connector shown in FIG. 6.

FIG. 6 is a side, partial cross sectional view of terminal 100 and female connector 86, and FIG. 7 is a top view of terminal 100 and connector 86. In comparing terminal 70 as shown in FIG. 2 and terminal 100 shown in FIG. 6, end portion 110, or leading edge, of terminal 100 is less thick than leading edge 96 of terminal 70. Connector 86 therefore more easily engages over terminal 100 since end portion 110 of terminal 100 does not form as tight of a fit with connector 86. In addition, as connector 86 is slid over terminal 100, protrusion 90 slides within slot 116.

As connector 86 continues to be slid over terminal 100, protrusion 90 contacts plate 102 at a ramp 126 of fluted portion 124. Particularly, slot 116 ends just short of ramp 126, and ramp 126 facilitates a smooth transition from no engagement with protrusion 90 to frill engagement therewith. Unlike the high friction initial contact between leading edge 96 of terminal 70, protrusion 90 easily slides under formed ramp 126 of terminal 100. Connector 86 is further pushed over terminal 100 until protrusion 90 is located, and extends, within opening 120.

When engaged to connector 86, raised surfaces 104 and 106 are in tight contact with surface 98 of connector 86, and protrusion 90 extends into opening 120. Raised surfaces 104 and 106 provide a tight fit between terminal 100 and connector 86. Connector 86 sometimes is referred to as a locking connector since protrusion 90 locks connector 86 in place with respect to terminal 100. To release connector 86, the operator depresses lever 94 so that protrusion 90 is withdrawn from opening 120, and connector 86 is slid back over terminal 100.

Many variations and modifications can be made to terminal 100. For example, and as explained above, connector 86 is a locking type connector. Rather than a locking type connector, terminal 100 could be used with a quick connect type connector. Also, rather than opening 120, a detent could be provided at the location of opening 120. The detent would provide resistance to separation of terminal 100 from a connector. Further, terminal 100 could have many different thicknesses, e.g., a nominal thickness of 20/1000 inches, selected for a particular application and standard. The leading edge of terminal 100 also could be coined so that the leading edge is even thinner.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A module configured to couple to an electric motor having a run winding, a motor starter and a start winding, a housing enclosing the motor and having a plurality of pins extending therefrom, said module comprising:

a first electrical conductor member electrically coupled with said motor starter, said first electrical conductor member comprising a terminal comprising a connector plate comprising a first side, a second side, an upper surface and a lower surface, at least one of said upper surface and said lower surface comprising at least one raised surface, said connector plate further comprising a slot extending from a leading edge of said plate into said at least one raised surface, and said at least one raised surface extending substantially linearly between said connector plate first side and said connector plate second side.

2. A module in accordance with claim 1 further comprising a second electrical conductor member in electrical circuit with said motor starter, said second electrical conductor member comprising a terminal comprising a connector plate comprising at least one raised surface and a slot extending from a leading edge of said plate.

3. A module in accordance with claim 1 further comprising a motor protector.

4. A module in accordance with claim 1 wherein said connector plate further comprises at least a second raised surface spaced from said one raised surface.

5. A module in accordance with claim 1 wherein said connector plate comprises an end portion comprising chamfer sections.

6. A module in accordance with claim 1 further comprising an opening in said connector plate.

7. A module in accordance with claim 1 further comprising a detent in said connector plate.

8. A module in accordance with claim 1 wherein said connector plate comprises a leading edge, and a gusset at an end of said plate opposite said leading edge.

9. A module in accordance with claim 1 wherein said plate comprises stainless steel.

10. A module in accordance with claim 1 wherein said plate comprises a fluted portion, said one raised surface located in said fluted portion.

11. A module in accordance with claim 1 wherein said plate tightly mates with a connector within a space of about $^{32}/_{1000}$ of an inch.

12. A module in accordance with claim 1 wherein said connector plate further comprises a fluted portion, said at least one raised surface located in said fluted portion.

13. A module in accordance with claim 12 wherein said connector plate further comprises a second raised surface located in said fluted portion.

* * * * *